US009187861B2

(12) United States Patent
Dominguez

(10) Patent No.: US 9,187,861 B2
(45) Date of Patent: Nov. 17, 2015

(54) DEVICE AND METHOD FOR SPREADING A CABLE OF CARBON FIBERS OR CARBON YARNS

(71) Applicant: MESSIER-BUGATTI-DOWTY, Vélizy-Villacoublay (FR)

(72) Inventor: Laurent Dominguez, Ternay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 164 days.

(21) Appl. No.: 14/021,610

(22) Filed: Sep. 9, 2013

(65) Prior Publication Data

US 2014/0069073 A1    Mar. 13, 2014

(30) Foreign Application Priority Data

Sep. 10, 2012    (FR) ...................................... 12 58429

(51) Int. Cl.

| D07B 7/18 | (2006.01) |
|---|---|
| B65H 51/005 | (2006.01) |
| C04B 35/83 | (2006.01) |
| D04H 1/4242 | (2012.01) |
| D04H 3/002 | (2012.01) |
| D04H 3/02 | (2006.01) |

(Continued)

(52) U.S. Cl.
CPC ................ *D07B 7/18* (2013.01); *B65H 51/005* (2013.01); *C04B 35/83* (2013.01); *D02J 1/18* (2013.01); *D04H 1/4242* (2013.01); *D04H 3/002* (2013.01); *D04H 3/02* (2013.01); *F16D 69/023* (2013.01); *D04H 3/105* (2013.01); *D07B 5/002* (2013.01); *D07B 2205/3007* (2013.01)

(58) Field of Classification Search
CPC ..... D02J 1/18; B65H 51/005; B65H 2701/31; B65H 2701/312; B65H 2701/314; D07B 7/18
USPC .............. 132/119.1, 122, 123, 126, 129, 145, 132/151
See application file for complete search history.

(56) References Cited

U.S. PATENT DOCUMENTS 3,150,393 A * 9/1964 Crookes et al. .................... 15/23
3,204,469 A * 9/1965 Spillers .......................... 74/22 R (Continued)

FOREIGN PATENT DOCUMENTS

| FR | 2 581 085 | 10/1986 |
|---|---|---|
| FR | 2 761 380 | 10/1998 |

(Continued)

OTHER PUBLICATIONS

French Search Report for FR1258429 dated May 17, 2013.

*Primary Examiner* — Shaun R Hurley
(74) *Attorney, Agent, or Firm* — Pillsbury Winthrop Shaw Pittman LLP

(57) ABSTRACT

A device for spreading a cable of carbon fibers or carbon yarns, includes a disk mounted on a rotary shaft and provided with at least one comb adapted to comb a cable of carbon fibers or carbon yarns in a direction substantially parallel to the longitudinal direction of the fibers or yarns of the cable. The comb includes a plurality of teeth protruding radially toward the outside of the disk, and a device for rotating the disk around its rotary axis. Furthermore, a method for spreading a cable of carbon fibers or carbon yarns, includes at least making the teeth of the comb of the device flush with the cable in a direction substantially parallel to the longitudinal direction of the fibers or yarns of the cable.

10 Claims, 2 Drawing Sheets

(51) Int. Cl.
   *D02J 1/18*   (2006.01)
   *F16D 69/02*   (2006.01)
   *D04H 3/105*   (2012.01)
   *D07B 5/00*   (2006.01)

(56) References Cited

U.S. PATENT DOCUMENTS

| | | | | |
|---|---|---|---|---|
| 3,349,782 | A | * | 10/1967 | Sawin ................... 132/119.1 |
| 4,362,173 | A | * | 12/1982 | Blinman ................ 132/119.1 |
| 4,368,376 | A | * | 1/1983 | Andis ........................ 219/222 |
| 4,959,895 | A | | 10/1990 | Sager |
| 5,042,122 | A | | 8/1991 | Iyer et al. |
| 6,311,377 | B1 | * | 11/2001 | Krueger ........................ 28/282 |
| 6,848,452 | B2 | * | 2/2005 | Kennedy et al. ............. 132/208 |
| 2003/0192564 | A1 | * | 10/2003 | Johnson ................. 132/119.1 |
| 2009/0229624 | A1 | * | 9/2009 | Purvis et al. .................. 132/120 |
| 2010/0307519 | A1 | * | 12/2010 | Couillard ..................... 132/120 |

FOREIGN PATENT DOCUMENTS

| | | |
|---|---|---|
| FR | 2 826 672 | 1/2003 |
| WO | WO 99/55943 | 11/1999 |
| WO | WO 2005/002819 | 1/2005 |

* cited by examiner

DEVICE AND METHOD FOR SPREADING A CABLE OF CARBON FIBERS OR CARBON YARNS

CROSS-REFERENCE TO RELATED APPLICATIONS

This application is based upon and claims the benefit of priority from French Patent Application No. 1258429, filed Sep. 10, 2012, the entire content of which is incorporated herein by reference.

BACKGROUND

The present invention relates to the general field of producing fibrous sheets obtained by spreading several cables of fibers or yarns.

One favored, but nonexclusive field of application of the invention is that of the production of three-dimensional fibrous preforms intended for the manufacture of annular parts made from a carbon-carbon (C—C) composite material, in particular the manufacture of brake disks.

Brake disks made from composite material, in particular a composite material reinforced with carbon fibers and a carbon matrix, are well known. Their manufacture comprises the production of an annular fibrous preform and the densification thereof by a matrix.

One known method for producing an annular fibrous preform consists of producing annular fibrous sheets (i.e., a so-called transverse sheet and a so-called circumferential sheet) by spreading and juxtaposition of several cables of carbon fibers or carbon yarns. The transverse and circumferential sheets are then bonded to each other by needling and are rotated. A thick annular fibrous structure is obtained by bonding several layers to each other by circular needling.

This method, one example embodiment of which is described in document WO 2007/048946, thus makes it possible to obtain an annular fibrous preform directly from cables of carbon fibers or carbon yarns with practically no wastage.

With such a method, the cables forming the transverse sheet are more precisely laid alternating in one direction and the other between the outer and inner coaxial rings of an installation. Inevitably, such a laying causes tightening of the carbon fibers or yarns toward the inner ring (relative to the outer ring).

Consequently, to obtain an annular fibrous sheet that is completely homogenous over its entire width, it is necessary to compensate the increase in the surface density of the transverse sheet at the inner ring due to this tightening through a corresponding decrease in the surface density of the circumferential sheet in that location.

To give the circumferential sheet a decreasing surface density between the outer ring and the inner ring of the installation, it is possible to form said sheet with cables having a same width, but having decreasing weights between the rings. However, this solution is relatively impractical to implement and requires the use of cables with different weights.

Another solution consists of further spreading the cable(s) in question before they are laid. However, the known spreading solutions have a certain number of drawbacks. In particular, a spreading device by blowing air does not make it possible to freeze the width of the cable and thus prevent it from returning to its initial appearance before it was placed between the rings of the installation. It is also important for the spreading of the cable to be done while preserving the homogeneity of fibers within the cable. Lastly, it must be possible to spread the cable without creating tension in the cable.

SUMMARY

There is therefore a need to be able to have a device for spreading a cable of carbon fibers or carbon yarns that meets all of these constraints.

According to an aspect of the invention, this goal is achieved by a device for spreading a cable of carbon fibers or carbon yarns, comprising a disk mounted on a rotary shaft and provided with at least one comb adapted to comb a cable of carbon fibers or carbon yarns in a direction substantially parallel to the longitudinal direction of the fibers or yarns of the cable, said comb including a plurality of teeth protruding radially toward the outside of the disk, and means for rotating the disk around its rotary axis.

With such a device, by causing the cable of carbon fibers or carbon yarns to pass through the teeth of the comb (or by making it flush with the teeth of the comb), it is possible to spread the fibers or yarns so as to widen the cable upon leaving the device. In fact, it has been observed that the teeth of the comb that penetrate the cable (or that are flush with it) to comb it in a direction substantially parallel to the longitudinal direction of the fibers or yarns forming the cable make it possible to spread the cable in the direction of its width. Furthermore, it has been observed that after combing, the cable remains at its width. It is in particular not necessary to use thermo-bonding fibers to ensure that the width of the cable is maintained. Furthermore, by causing the cable to pass in the same direction of movement as the direction of rotation of the disk of the device, it is possible to achieve widening of the cable without creating tension therein at the outlet of the device. Lastly, this device is easy to implement, does not create noise disturbance, and can easily be integrated into an installation for manufacturing an annular fibrous sheet.

In an embodiment, the device further comprises means for adjusting the radial position of the comb on the disk. For example, a radial position adjusting device may be used. Thus, the comb may be mounted on the disk in a radial groove and capable of sliding inside the latter so as to allow adjustment of the radial position of said comb on the disk.

Also in an embodiment, the device further comprises means for adjusting the orientation of the teeth of the comb. For example, an orientation adjusting device may be used. Thus, the comb may be mounted on the disk by means of a pivoting link so as to make it possible to adjust the orientation of the teeth of said comb.

An aspect of the invention also relates to a method for spreading a cable of carbon fibers or carbon yarns, consisting of at least making the teeth of the comb of the device as previously defined flush with the cable in a direction substantially parallel to the longitudinal direction of the fibers or yarns of said cable.

The cable of carbon fibers or carbon yarns may move relative to the device in a direction substantially tangential to the disk.

Furthermore, the cable of carbon fibers or carbon yarns may move relative to the device in the same direction as the direction of rotation of said disk. It is thus possible not to generate tension in the cable.

The teeth of the combs of the device may penetrate the cable without passing through it. In this way, it is easy to preserve homogeneity of fibers in the cable after it has passed through the teeth of the combs of the device.

Another aspect of the invention also relates to the use of such a method to produce a fibrous sheet by spreading and juxtaposing several cables of carbon fibers or carbon yarns.

BRIEF DESCRIPTION OF THE DRAWINGS

Other features and benefits of the present invention will emerge from the description provided below, in reference to the appended drawings, which illustrate one non-limiting example embodiment thereof. In the figures.

DETAILED DESCRIPTION

An embodiment of the invention is particularly applicable to installations for manufacturing an annular fibrous preform intended to produce annular parts made from a carbon-carbon (C—C) composite material, in particular for the manufacture of brake disks.

An installation for manufacturing an annular fibrous preform is described in patent application WO 2007/048946, the content of which is integrated by reference and will therefore not be outlined here.

In substance, such an installation comprises a device for bringing in a first fibrous sheet and laying the latter on an annular support alternating in one direction and then the other between the outer and inner coaxial circular rings situated on either side of the annular support to form a first annular sheet, or transverse sheet.

Such an installation also comprises a device for bringing in a second fibrous sheet on the annular support and laying the latter in the circumferential direction between the outer and inner rings to form a second annular sheet, or circumferential sheet. A device is provided to rotate the transverse and circumferential sheets around the axis of the rings.

With this type of installation, it is necessary to give the circumferential sheet a decreasing surface density between the outer ring and the inner ring to balance the increasing surface density of the transverse sheet and thus to obtain an assembly having a substantially uniform surface density over its entire width.

The device according to an embodiment of the present invention allows performing such a function by performing spreading (or widening) of one or more fibers or yarns cables (or tows)—here carbon cables—used to produce the circumferential sheet.

It will be appreciated that the spreading device according to an embodiment of the present invention more generally applies to any installation in which one wishes to obtain widening of a fibers or yarns cable, this widening having to remain frozen after the cable has passed through the device.

Figure 1:
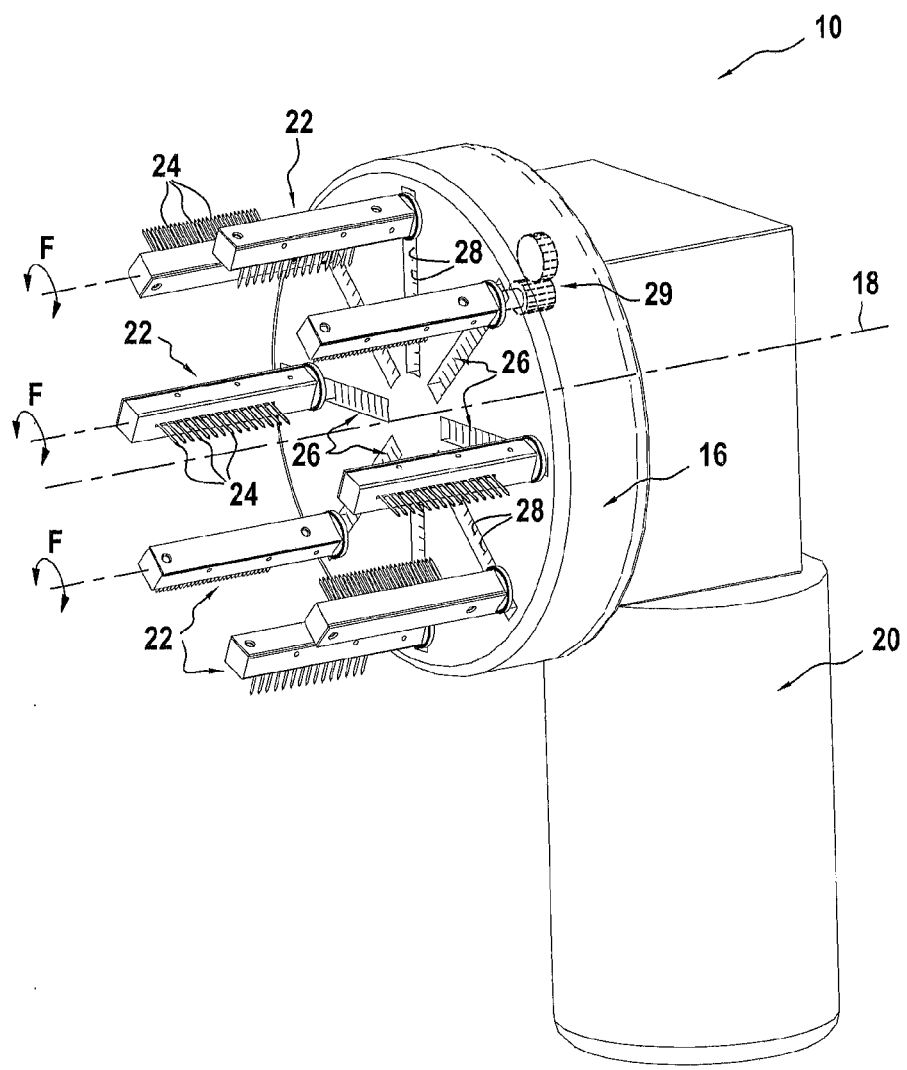
FIG. 1 is a perspective view of a device for spreading a cable of carbon fibers or carbon yarns according to the invention.
Figure 2:
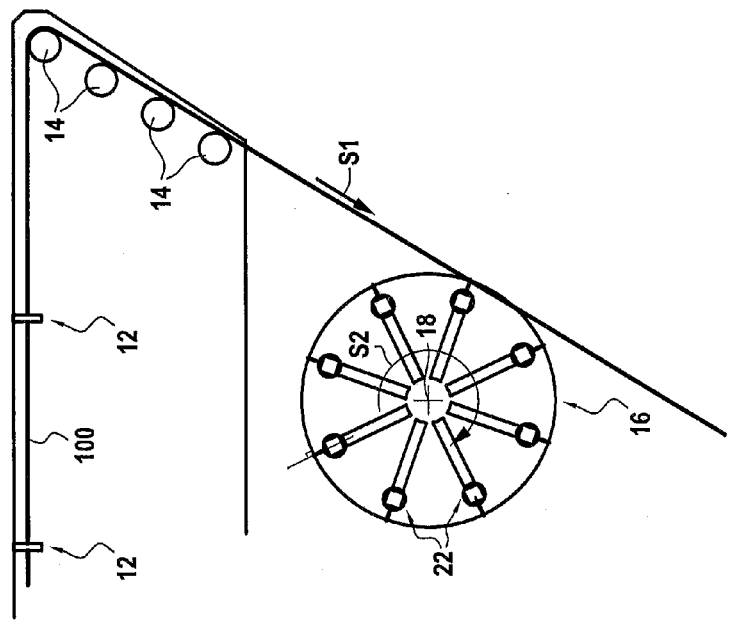
FIGS. 2 and 3 diagrammatically show the operation of the device of FIG. 1.
Figure 3:
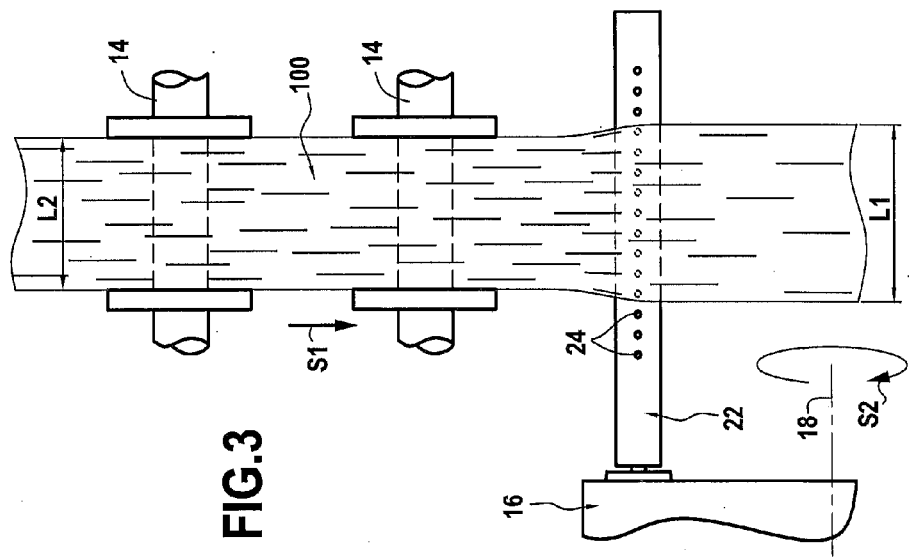

The spreading device 10 shown in FIGS. 1 to 3 may thus adapt to an installation for manufacturing an annular fibrous preform like that described in patent application WO 2007/048946. In particular, this spreading device may be mounted just upstream from the device for bringing in the second fibrous sheet on the annular support of the installation.

In this type of installation, the cable of carbon fibers or carbon yarns intended to form the circumferential sheet of the annular fibrous preform generally pass through eyelet plates 12. At the outlet of these eyelets, each cable 100 passes over a guide bar 14 before being conveyed toward the spreading device 10 according to the invention.

The cables of carbon fibers or carbon yarns 100 used may be formed from 50,000 filaments (50 K) or 24,000 filaments (24 K), having respective masses of 3.85 kTex and 1.6 kTex.

The spreading device 10 according to an embodiment of the invention comprises a disk 16 that is mounted on a support (not shown) rotatably relative to it is axis of revolution 18. The rotation of the disk around its axis of revolution is ensured by an electric motor 20 also mounted on the support of the spreading device (or by any other means or devices).

The disk 16 is provided with at least one comb 22 (there are 8 in the example illustrated in FIGS. 1 to 3) that is adapted to comb one or more cables of carbon fibers or carbon yarns in a direction substantially parallel to the longitudinal direction of the fibers or yarns of the cable. To that end, the bars 14 are positioned relative to the disk 16 so as to ensure guiding of one or more cables to be spread toward the disk in a direction substantially tangential thereto.

To ensure such combing, each comb 22 comprises multiple teeth 24 (FIG. 3) protruding radially outward from the disk. Owing to the guiding of the cable(s) to be spread by the bars 14 of the spreading device, at least some of the teeth 24 of the combs at least partially penetrate the corresponding cable(s) to spread them, as will be described later relative to FIGS. 2 and 3.

It should be noted that the combs 22 mounted on the disk of the device do not necessarily have the same characteristics. For example, it is possible to have combs whereof the geometry and nature of the teeth (length, diameter, profile, geometry of the tip, material, etc.) differ. These characteristics are parameters that influence the degree of widening of the cable.

According to one beneficial arrangement shown more specifically in FIG. 1, each comb 22 is mounted in a radial groove 26 formed in the disk 16 and can slide inside the latter so as to make it possible to adjust the radial position of said comb on the disk. Notches 28 formed in the radial grooves 26 ensure that the combs are kept in position. It is thus possible to adjust the position of the columns as a function of the cables used.

According to another beneficial arrangement, each comb 22 is mounted on the disk 16 by means of a pivot link 29 so as to make it possible to adjust the orientation of the teeth of said comb (arrows F in FIG. 1). In particular, it is thus possible to adjust the angle between the cable to be combed and the teeth of the comb.

FIGS. 2 and 3 diagrammatically show one example of embodiment of such a spreading device.

A cable 100 of carbon fibers or carbon yarns supplies the spreading device by traveling through the eyelet plates 12 thereof. The cable 100 reaches the bars 14, which guide it toward the disk 16 of the spreading device. More specifically, as shown in FIG. 2, the cable 100 is guided to progress tangentially relative to the disk 16.

The disk 16 of the spreading device is rotated around its axis of revolution 18 such that at least one of its combs 22 combs the cable in a direction substantially parallel to the longitudinal direction of the fibers or yarns forming said cable. During this movement, the teeth 24 of the combs that comb the cable during the rotation of the disk penetrate at least partially the fibers or yarns of the cable.

It has been observed that simple combing (that does or does not go through the cable) of the fibers or yarns of the cable makes it possible to obtain spreading thereof (the width L1 of the cable 100 at the outlet of the spreading device is greater than its width L2 at the inlet—FIG. 3). Furthermore, the spreading is obtained while preserving the homogeneity of the fibers in the direction of the width of the cable after the passage thereof in the teeth of the comb.

In particular, the final width of the cable may be controlled as follows. Once an optimal configuration has been defined (in particular in terms of number of combs, number and geometry of teeth of the combs, radial position of the combs, angle between the teeth of the comb and the cable etc.), the final length of the cable may be regulated simply by adjusting the speed of rotation of the disk. Furthermore, regarding overlap of the combing, at a certain speed of rotation of the disk, the cable may be combed several times in the same location, which will make it possible to obtain a more significant final widening.

A widening test was done on a cable taking a cable of carbon fibers or yarns made up of 50,000 filaments and having an initial width of approximately 20 to 25 mm. The device used during this test comprised 6 combs each having a width of 60 mm and being provided with teeth with sharp ends (with a gap between two adjacent teeth of approximately 2 mm). The columns were mounted on a disk having a diameter of 200 mm and driven at a speed of rotation of 140 revolutions per minute in the direction of movement of the cable.

This test made it possible to obtain, at the outlet of the device, a cable width of approximately 50 mm, compared to the initial width of 20 to 25 mm. It is thus easy to double the width of the cable.

It was also observed that the spreading of the cable remained frozen after it passed through the teeth of the comb, i.e., it did not return it to its initial width after being combed.

Various parameters influence the spreading of the cable that passes through the teeth of the comb. Thus, if one wishes for the combing not to create tension in the cable, it is desirable for the movement direction S1 of the cable to be identical to the direction of rotation S2 of the disk 16 of the spreading device. Conversely, if one wishes to generate tension in the cable, it is desirable for these directions of movement to be contrary.

Likewise, the number of combs that penetrate the cable, the length of their travel in the cable, the number of combing cycles, etc. are all parameters that have a direct impact on the spreading of the cable.

The invention claimed is:

1. A device for spreading a cable of carbon fibers or carbon yarns, comprising:
    a disk mounted on a rotary shaft and provided with at least one comb adapted to comb a cable of carbon fibers or carbon yarns in a direction substantially parallel to the longitudinal direction of the fibers or yarns of the cable, said comb including a plurality of teeth protruding radially toward the outside of the disk;
    means for rotating the disk around its rotary axis; and
    means for adjusting the orientation of the teeth of the comb including a pivoting link,
    wherein the comb is mounted on the disk by means of the pivoting link so as to make it possible to adjust the orientation of the teeth of said comb.

2. The device according to claim 1, wherein the comb is arranged at a radial position on the disk, the device further comprising means for adjusting the radial position of the comb on the disk.

3. The device according to claim 2, wherein the comb is mounted on the disk in a radial groove and is capable of sliding inside the latter so as to allow adjustment of the radial position of said comb on the disk.

4. A method for spreading a cable of carbon fibers or carbon yarns, comprising at least making the teeth of the comb of the device according to claim 1 flush with the cable in a direction substantially parallel to the longitudinal direction of the fibers or yarns of said cable, the teeth of the comb of the device penetrating the cable without passing through it.

5. The method according to claim 4, wherein the cable of carbon fibers or carbon yarns moves relative to the device in a direction substantially tangential to the disk.

6. The method according to claim 4, wherein the cable of carbon fibers or carbon yarns moves relative to the device in the same direction as the direction of rotation of said disk.

7. A method comprising producing a fibrous sheet by spreading and juxtaposing several cables of carbon fibers or carbon yarns using the method of claim 4.

8. A device for spreading a cable of carbon fibers or carbon yarns, comprising:
    a disk mounted on a rotary shaft and provided with at least one comb adapted to comb a cable of carbon fibers or carbon yarns in a direction substantially parallel to the longitudinal direction of the fibers or yarns of the cable, said comb including a plurality of teeth protruding radially toward the outside of the disk;
    a motor configured to rotate the disk around its rotary axis; and
    an orientation adjusting device configured to adjust the orientation of the teeth of the comb,
    wherein the orientation adjusting device comprises a pivoting link to mount the comb on the disk so as to make it possible to adjust the orientation of the teeth of said comb.

9. The device according to claim 8, further comprising a radial position adjusting device configured to adjust the radial position of the comb.

10. The device according to claim 8, wherein the radial position adjusting device includes a radial groove and a plurality of notches formed in the disk, wherein the comb is capable of sliding inside the groove so as to allow adjustment of the radial position of said comb on the disk and wherein the plurality of notches are formed in the radial groove to maintain the comb at a desired position.

* * * * *